June 11, 1963 F. H. TENNIS 3,093,158
DETENT MECHANISM FOR HYDRAULIC CONTROL VALVE
Filed Oct. 31, 1960 3 Sheets-Sheet 3

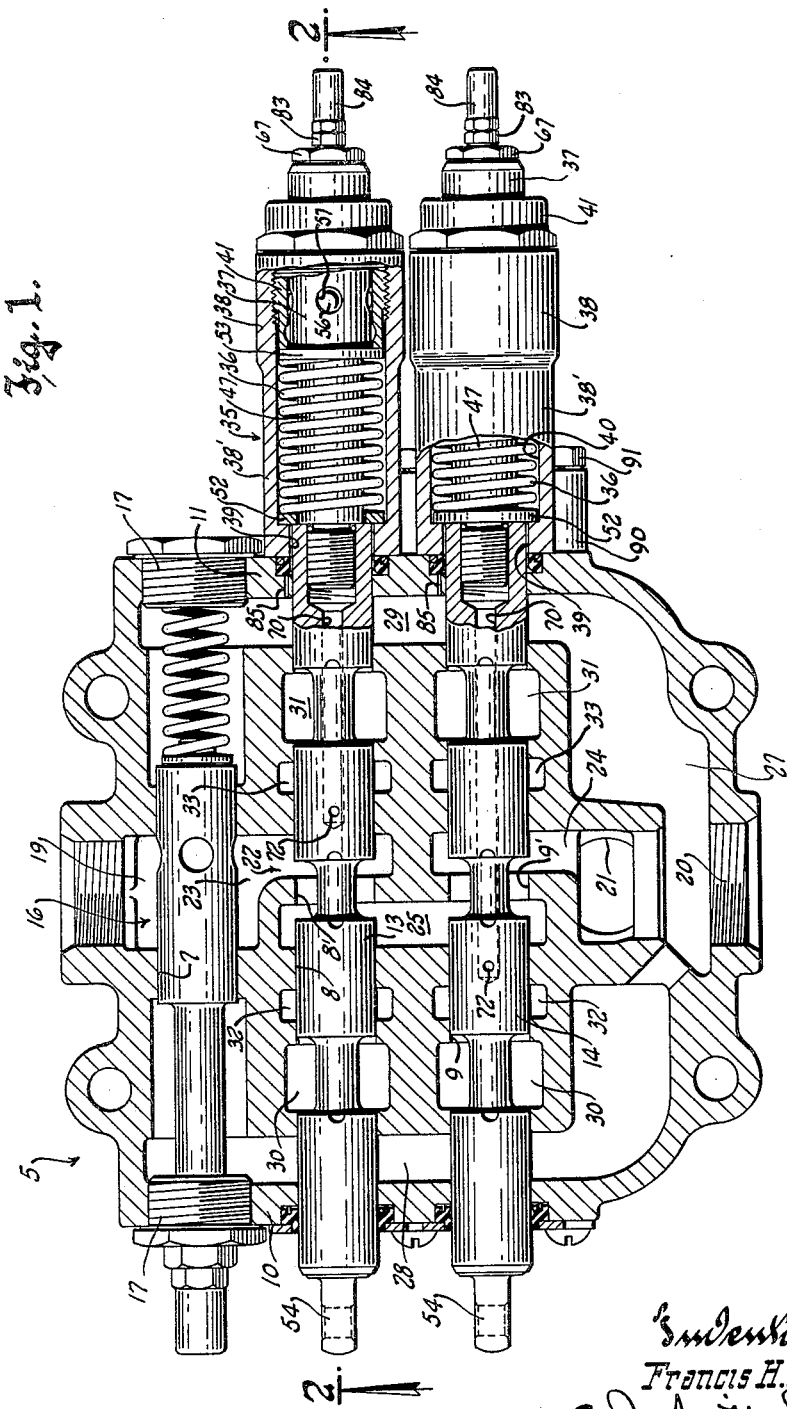

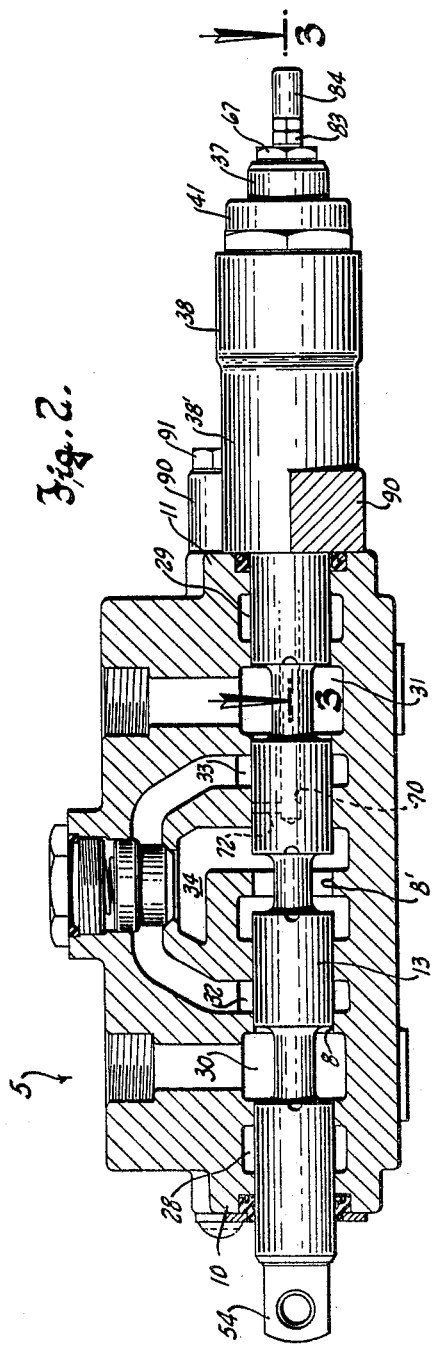

Inventor
Francis H. Tennis

United States Patent Office 3,093,158
Patented June 11, 1963

3,093,158
DETENT MECHANISM FOR HYDRAULIC CONTROL VALVE
Francis H. Tennis, Milwaukee, Wis., assignor to Hydraulic Unit Specialties Company, Pewaukee, Wis., a corporation of Wisconsin
Filed Oct. 31, 1960, Ser. No. 66,167
7 Claims. (Cl. 137—622.5)

This invention relates to detent mechanisms generally, and refers more particularly to an improved detent mechanism which is especially well suited for use with control valves by which fluid pressure operated mechanisms are governed.

The detent mechanism of this invention is of the type disclosed in Patent No. 2,848,014, issued August 19, 1958, to Francis H. Tennis, and thus comprises, in general, a tubular detent carrier which is axially slidable in a bore in a body part and which carries one or more detent members that are urged radially outwardly for engagement in a circumferential groove in the body part opening to its bore. Such radially outward bias of the detent members is effected by an axially slidable cam member in the detent carrier having a cam surface that is at all times engaged with the detent members and which is biased in one axial direction relative to the detent carrier.

As applied to a hydraulic control valve of the type having valve elements or spools that are axially movable in bores in a valve body, a detent carrier of such a detent mechanism is connected with one end of each spool for axial motion therewith, and the detent members cooperate with a circumferential groove or grooves in the valve body to define one or more operating positions to which the spool can be moved.

To provide for automatic return of the valve spool from one of its operating positions to its neutral position, a control valve equipped with such detent mechanisms includes a centering spring for each spool which reacts between the spool and the valve body to urge the spool toward the neutral position. The detent mechanism is automatically released, to permit the centering spring to shift the spool back to neutral, when the hydraulic cylinder controlled by the spool reaches the limit of its travel and fluid pressure in the valve body consequently rises to a "kick-out" pressure which is higher than the pressure that prevailed while the cylinder was moving through its working stroke. Such automatic release of the detent mechanism is effected by a fluid pressure responsive plunger which is axially slidable in the detent carrier and which has a motion transmitting connection with the cam member whereby the latter is moved against its bias in consequence of the admission of pressure fluid to the interior of the detent carrier. Fluid enters the detent carrier by way of a passage in the valve spool connected therewith and through a valve seat in the detent carrier that is normally engaged by a fluid pressure responsive pilot valve element.

The "kick-out" pressure setting at which release of the detent mechanism is effected is governed by the force which a valve spring exerts upon the pilot valve element to bias it toward engagement with its seat. The desired kick-out pressure for a given control valve application depends to a substantial extent on the intended loading of the hydraulic cylinder or other mechanism connected with the valve for control thereby, and therefore it is extremely desirable that some means be provided for adjustably varying this kick-out pressure setting, to enable a hydraulic control valve embodying such detent mechanism to be adapted for various types of installations. The detent mechanism of Patent No. 2,848,014, however, provided no means for adjusting the biasing force of the pilot valve spring so that its kick-out pressure could not be changed without disassembling the mechanism.

By contrast, it is an object of the present invention to provide a detent mechanism of the character described which is particularly adapted for hydraulic control valves and wherein means are provided for readily adjusting the kick-out pressure setting of the detent mechanism, that is, the value of fluid pressure in the valve body which effects release of the detent mechanism to allow the valve spool to which the detent mechanism is connected to be returned to its neutral position by its centering spring.

More specifically, it is an object of this invention to provide a fluid pressure actuated detent release mechanism of the character described, comprising a tubular detent carrier having its inner end connected with a spool of a hydraulic control valve for movement therewith in the valve body and having a spring biased pressure responsive pilot valve at its inner end which admits pressure fluid to the interior of the detent carrier for actuation of the detent release mechanism when the pressure of such fluid reaches a predetermined kick-out value, in which mechanism the force exerted by the pilot valve spring is adjustable by means of a set screw or the like which is accessible at the outer end of the detent carrier despite the fact that the detent carrier carries detent members, a cam member, and a pressure responsive plunger for actuating the cam member to a position at which the detent members are retracted, all of which are located between the pilot valve seat and the outer end of the detent carrier.

Thus the general object of the present invention may be said to reside in the provision of a detent mechanism for a hydraulic control valve which is similar to that of Patent No. 2,848,014, but which embodies an important and very advantageous improvement thereover, consisting of the provision of means in the nature of an accessible set screw or the like for readily adjusting the kick-out pressure setting of the mechanism.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 1 is a horizontal section view through a hydraulic control valve, illustrating the application thereto of the detent mechanism of this invention;

FIGURE 2 is a vertical sectional view through the control valve taken generally along the plane of the line 2—2 in FIGURE 1;

FIG. 3 is an enlarged fragmentary sectional view taken generally along the plane of the line 3—3 in FIGURE 2, showing the detent mechanism for one of the spools;

Figure 5:
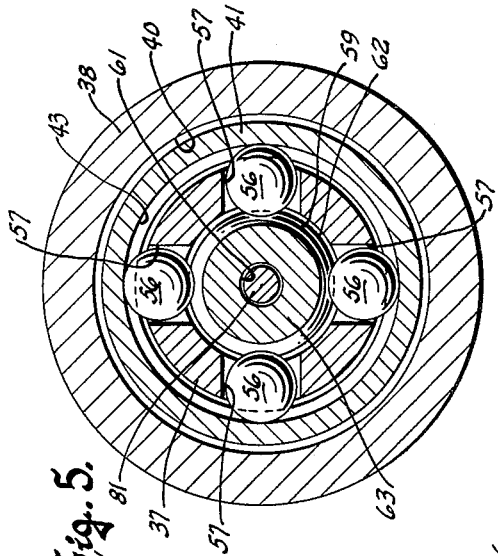
FIGURE 5 is a view similar to FIGURE 4 but showing the detent mechanism in its detent defining position.
Figure 4:
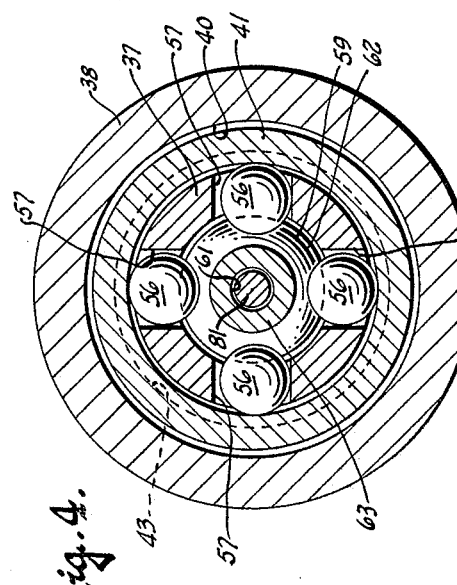
FIGURE 4 is a sectional view taken on the plane of the line 4—4 in FIG. 3.

Referring now more particularly to the accompanying drawings, in which like numerals designate like parts throughout the several views, the numeral 5 designates generally the casing or body of a hydraulic control valve like that disclosed in Patent No. 2,873,762, issued February 17, 1959, to Francis H. Tennis, to which reference may be had for a complete description of the construction of the valve and the arrangement of passages therein. For the purpose of this invention, however, it is sufficient to note that the control valve is provided with three spaced horiontal bores 7, 8 and 9 extending parallel to one another across the body of the valve from one end wall 10 thereof to the other end wall 11 and opening therethrough. The bores 7 and 9 are located near the opposite sides of the body, while the bore 8 is substantially midway between them.

Each of the bores 8 and 9 intersects and communicates with a number of passages formed in the interior of the valve body to enable valve elements or spools 13 and 14 slidably received in the respective bores 8 and 9 to control the flow of fluid from a pump (not shown) to a pair of double acting hydraulic cylinders or other pressure operated mechanisms (not shown). The usual relief valve mechanism, generally designated 16, is accommodated in the upper bore 7 to prevent the build up of higher than normal operating pressures in the valve passages, it being understood that the opposite ends of the bore 7 are closed by the plugs 17.

As brought out at length in the aforesaid Patent No. 2,873,762, fluid from the pump is introduced into an inlet chamber 19 formed as an enlargement of the upper bore 7 medially of its ends to normally travel downwardly through the valve and out of its bottom through one or the other of a pair of discharge ports 20 or 21 in the lower end portion of the valve body, a through passage generally designated 22 being provided in the valve body for this purpose. The through passage is comprised of an intermediate section 25 which spans and communicates with the bores 8 and 9, and upper and lower sections 23 and 24 which respectively communicate with the bores 8 and 9 at ones spaced axially a short distance to the right of the ends of the intermediate section 25, to communicate therewith through holes 8' and 9' in the body coaxially with the bores 8 and 9 and forming part of the same.

The upper section 23 of the through passage, of course, communicates with the inlet chamber 19, while the lower section 24 of the through passage communicates with the bight portion of a U-shaped exhaust passage 27, as well as with one or the other of the alternate outlets 20 and 21 in the valve body.

The legs 28 and 29 of the exhaust passage 27 are located near the left and right end walls 10 and 11 respectively of the valve body and crosswise intersect all of the bores 7, 8 and 9. Inwardly of the legs 28 and 29 of the exhaust passage, the bore 8 for the valve element 13 is enlarged to provide a pair of annular chambers 30 and 31 which communicate with a pair of motor ports opening to the top of the valve body, and other enlargements of the bore 8 provide a second pair of annular chambers 32 and 33 each intermediate the through passage and one of the motor port chambers and communicating with one another as shown in FIGURE 2. Normal high operating pressure obtains in the chambers 32 and 33 and in a supply passage 34 which connects them with the inlet chamber 19, whenever the spool 13, for instance, is shifted in one direction or the other from its neutral or "hold" position, seen in FIGURE 1, to an operating position in which said spool closes the hole 8' in the bore to block off communication between the upper and lower sections of the through passage 22. Since the spool 13 is intended for the control of a double acting hydraulic cylinder having its opposite ends communicated with the motor port chambers 30 and 31, the spool, in each of its two operating positions communicates one of its high pressure supply chambers 32—33 with its adjacent motor port chamber, and communicates the other motor port chamber with the adjacent leg of the exhaust passage.

The spool 14 is substantially identical with the spool 13, and is associated with similar passages and chambers in the valve body, hence only the spool 13 is described herein.

Obviously the spool 13 could be used to control a single acting hydraulic cylinder, in which case the motor port leading to one of the chambers 30 or 31 would be plugged so that fluid under pressure would be both supplied to and exhausted from the single acting hydraulic cylinder through the other motor port chamber.

The spool 13 is normally biased to occupy its neutral or "hold" position, shown in FIGURE 1, by means of a centering device generally designated 35 which includes a helically coiled compression spring 36, but it is releasably held in either of its operating positions to which it may be manually shifted, against the centering force of the spring 36, by means of an automatic detent mechanism comprising a hollow or tubular detent carrier 37 which is coupled to the spool and which is axially slidable in a substantially tubular body part 38 that is secured to the valve body 5 coaxially with the bore in which the spool is received. Since the detent carrier 37 is rigidly connected to the spool, it is constrained to slide back and forth in unison therewith and will also be normally held in neutral or "hold" position by the centering spring 36.

It will be understood that the spool 14 is provided with centering and detent mechanisms like those for the spool 13.

The body part 38 comprises a main member 38' that has a bore 39 which opens to its inner end and registers with the bore 8 in the valve body, and has an outwardly opening counterbore 40. It is provided with bosses 90 at diametrically opposite sides thereof through which extend screws 91 that are engaged in the valve body 5 to secure the body part thereto. The body part also includes a bushing member 41 which extend partway into the counterbore 40 from the outer end thereof. Along most of the length of the bushing member 41 there is a small clearance between it and the detent carrier 37, but near its outer end the bushing member carries suitable seal means 45 which snugly embrace the detent carrier.

The detent carrier may be connected to the valve spool 13 by an extension 47 on its inner end which provides a nipple that is coaxially threaded into the spool. The outer end portion of the detent carrier has a diameter larger than the inner portion thereof to provide an inwardly facing circumferential shoulder 48 which opposes an outwardly facing circumferential shoulder 49 defined by the outer end of the spool 13. In the neutral position of the spool the inwardly facing circumferential shoulder 48 is radially aligned with the inner end 50 of the bushing member 41, and the outwardly facing circumferential shoulder 49 is radially aligned with the circumferential shoulder 51 defined by the junction of the bore 39 and counterbore 40 in the body part.

The centering spring 36 encircles the inner end portion of the detent carrier, between a washer 52 which is adapted to abut the outwardly facing circumferential shoulders 49 and 51 and a washer 53 which is adapted to abut the inwardly facing circumferential shoulders 48 and 50. Hence as is apparent from FIGURE 1, where the valve element 13 is shown in neutral position, its centering spring 36 is endwise confined between one set of axially opposing abutments 48 and 49, on the valve element, and also between a second set of axially opposing abutments 50 and 51 on the body, each of the latter being in planar alignment with one of those on the valve element when the spool is in "hold" position. As is well understood by those skilled in the art, the compression spring 36 is thus arranged to be compressed as as consequence of sliding of the spool in either direction from its neutral position by the manual application of force to the left hand end 54 of the spool.

Normally, the centering spring requires the spool to be manually held in either of its operating positions until the operator releases the spool for spring propelled travel to its neutral position, but in this case the detent mechanism comprising the detent carrier 37 holds the spool in any one of a plurality of operating positions to which it may be shifted, until such time as fluid in the valve body attains a predetermined kick-out pressure, whereupon the detent mechanism automatically releases the spool to allow the spring 36 to move it back to neutral. To prevent the spool from being propelled beyond its axially outermost detent defined positions, the detent carrier is provided with a pair of abutments 92, spaced axially inwardly of the washers 52 and 53 and adapted to engage one of them at each of the axially outermost detent defined positions of the spool. Said abutments may be integrally formed on the carrier, or they may be provided by snap rings engaged in circumferential grooves in the detent carrier as shown, or even a sleeve of the proper length loosely encircling the carrier.

In the defined operating positions of the spool a plurality of detent members 56, carried by the tubular detent carrier and biased radially outwardly through holes 57 in the carrier wall, engage in one or the other of a pair of circumferential grooves 42 and 43 that open to the bore of the bushing member 41, and by such engagement the detent members releasably hold the detent carrier against axial shifting out of the operating position in response to the bias of the centering spring. Preferably the detent members comprise small balls that fit loosely in the holes 57, and they are maintained under radial outward bias by a compression spring 58 in the detent carrier, acting through an axially slidable cam member 59 with which the balls are at all times engaged. In the present case there are four detent members or balls 56, and the holes 57 in which they are received are circumferentially equispaced and disposed on radial axes lying in a common transverse plane.

The grooves 42 and 43 with which the detent balls 56 cooperate are formed at axially spaced apart locations along the bore of the body part that correspond to two operating positions of the spool 13.

The cam member 59, by which the axially inward biasing force of the detent spring 58 is translated into radially outward bias of the balls 56 in their holes 57, fits in the bore 60 of the detent carrier with a substantial clearance. It has a coaxial bore 61 therethrough and has a coaxial cam surface 62 at its exterior which may be substantially spherical and which is normally engaged with the balls 56. Projecting inwardly from the cam portion 62 of the cam member, centrally of and past the detent balls 56, is a smaller diameter coaxial extension 63 which retains the balls in their holes 57 and also provides a motion transmitting connection between the cam member and a fluid pressure responsive plunger 64 that is slidably received in the detent carrier inwardly of the cam member.

The compression spring 58 encircles an integral coaxial pilot portion 65 on the cam member which projects outwardly from its cam portion 62 and which has a smaller diameter than the cam portion. The spring 58 reacts between a plug 67 fixed in the outer end of the detent carrier and an outwardly facing circumferential abutment 68 on the cam member, to thus urge the cam member axially toward a detent defining position in which its cam surface 62 is substantially in radial alignment with the holes 57 in the detent carrier. Hence, when the spool and the detent carrier 37 attached thereto are shifted in either axial direction, to one or the other of the operating positions of the spool, the holes 57 in the carrier are brought into registry with one or the other of the grooves 42 or 43 in the body part and the detent balls 56 are snapped radially outwardly in their holes by the spring biased cam member 59 so that outer portions of the detent balls engage in the groove with a force sufficient to hold the spool against spring biased return motion to its neutral position.

It will be understood, of course, that at any time desired the operator can manually shift the spool and its detent carrier out of a detent defined operating position, for return to its neutral position by the centering spring 36, merely by exerting sufficient axial force upon the end 54 of the spool to cause the detent balls 56 to be cammed radially inwardly of their holes 57, due to the action of the curved surfaces of the grooves 42 and 43 on the spherical surfaces on the detent members.

It is also possible for the balls to be released automatically from engagement with one of the circumferential grooves in consequence of the admission of pressure fluid to the interior of the detent carrier. Such fluid moves the plunger 64 axially outwardly in the detent carrier, and the plunger, in turn, propels the cam member 59, against the bias of the spring 58, out of its detent defining position in which it holds the balls partway projected out of the carrier. It will be observed that the inward extension 63 on the cam member, which provides the motion transmitting connection between it and the plunger, passes centrally between the detent balls and has a diameter such that it allows full retraction of the balls while preventing inward displacement of them from their holes 57.

For the purpose of introducing pressure fluid into the bore 60 in the detent carrier in which the plunger 64 and cam member 59 operate, the nipple 47 on the inner end of the detent carrier is provided with a substantially small diameter coaxial passage 69, the outer end of which opens into the bore 60, and the inner end of which communicates with a coaxial passage 70 in the valve spool that leads inwardly of the spool and terminates just short of its central groove. A port 72, drilled radially in the spool, communicates the coaxial passage 70 in the spool with the bore 8 in which it slides at a point substantially midway between the zones at which the bore communicates with the section 23 of the through passage and the high pressure chamber 33 when the spool is in its neutral or "hold" position seen in FIGURE 1. The location of the port 72 is therefore such that when the spool is shifted to the left from neutral to one of its detent defined operative positions, the port will communicate with the inlet section 23 of the through passage; and when the spool is shifted to the right, from neutral to the other of its detent defined operative positions, the port 72 will be brought into communication with the high pressure supply chamber 33.

While the hydraulic cylinder controlled by the spool is moving through its normal working stroke, pressure fluid in the passage 70 in the spool is prevented from entering the bore 60 in the detent carrier by means of a pilot valve 73 which is biased axially inwardly toward engagement with a valve seat 74 defined by the junction of the small coaxial passage 69 in the nipple 47 with the larger bore 60 in the detent carrier proper. The pilot valve has an outwardly projecting coaxial stem portion 75 that is encircled by a coiled compression spring 76 which urges the pilot valve toward its seat. Since the stem portion 75 of the pilot valve is smaller in diameter than its head, the axially outer face of the head provided a circumferential abutment 71 which serves as a seat for the valve spring 76. The pilot valve is responsive to fluid pressure in the passage 69 in the nipple, and when the pressure of such fluid rises above a predetermined kick-out value, as when a hydraulic cylinder controlled by the associated spool reaches the end of its working stroke, the pilot valve is moved off of its seat 74 by the pressure fluid, against the bias of spring 76, and fluid can enter the bore 60 in the detent carrier to propel the plunger 64 outwardly and thus release the detent mechanism.

It is a feature of this invention that the biasing force which the pilot valve spring 76 exerts upon the pilot valve 73 is adjustably variable, to thus provide for adjustment of the kick-out pressure at which the detent mechanism is automatically released. To this end there is provided an adjustable spring seat member 77, comprising a spring seat portion 80 having an inwardly facing abutment which opposes the pilot valve and against which the pilot valve spring 76 reacts, a stem portion 81 that extends coaxially through the bore 61 in the cam member and a coaxial bore 82 in the plunger 64, and a threaded set screw portion 78 that is engaged in the plug 67 in the outer end of the detent carrier and has its inner end bearing against the outer end of the stem portion. The three portions 80, 81 and 78 of the spring seat member are preferably made as separate elements, as shown, to facilitate assembly of the mechanism, but they could obviously be formed integrally with one another.

The set screw portion 78 of the spring seat member projects outwardly beyond the plug 67 so as to be readily accessible, and is provided with a screw driver cross slot or the like to facilitate its axial adjustment. A lock nut 83 may be threaded onto it to engage against the outer face of the plug 67 and hold the spring seat member in any position to which it may be adjusted, and a cap 84 may be threaded onto its projecting end portion to keep it clean and discourage tampering with it.

It will be seen that the threaded set screw portion 78 of the spring seat member enables the axial position of the spring seat abutment 80 at the inner end of the spring seat member to be adjustingly varied relative to the detent carrier. Such adjustment of the spring seat abutment 80 of course effects adjustment of the seating force exerted upon the pilot valve 73 by its spring 76, and thus determines the value of fluid pressure in the valve body at which the pilot valve will be unseated to admit fluid to the bore 60 in the detent carrier. Because the stem portion 81 of the spring seat member has a sliding fit in the bore 61 in the cam member and the bore 82 in the plunger 64, the spring seat member does not interfere with axial motion of those parts relative to the detent carrier.

Assuming now that the spool 13 is shifted to its left hand operating position, the balls 56 will engage in the circumferential groove 42 and the motor port chamber 31 will be communicated with the supply passage chamber 33. Pressure fluid will therefore flow to that side of a double acting hydraulic cylinder controlled by the valve which is communicated with the chamber 31. At the same time, the port 72 in the spool will be in register with the upstream section 23 of the through passage, so that pressure fluid is brought to the pilot valve 73 through the communicating passages 70 and 69. During the working stroke of the cylinder the pressure in the passage sections 23, 70 and 69 will not be high enough to unseat the pilot valve against the bias of its spring 76 (assuming, of course, that the spring seat member 77 is properly adjusted for the installation), but when the cylinder reaches the end of its working stroke the pressure in the communicating inlet and supply passages of the control valve tends to quickly rise above normal high operating pressure, unseating the pilot valve. Pressure fluid then enters the bore 60 in the detent carrier, moving the plunger 64 outwardly and thus shifting the cam member 59 out of its detent defining position, against the bias of detent spring 58, to release the balls 56 from the groove 42 and permit the centering spring 36 to shift the spool back to neutral.

When the spool 13 is shifted to its right hand operating position the laterally opening port 72 therein registers with the supply passage 33. Since the pressure in the supply passage chambers 32 and 33 is approximately equal to that in the upstream section 23 of the through passage whenever the spool 13 is in an operating position, the sequence of events for detent release will be the same in the right hand operating position of the spool as that described above for its left hand operating position.

It will be understood that the plunger 64 and the cam member 59 both have a substantially loose fit in the bore 60 of the detent carrier, and the carrier has a loose fit in the body part 38. Hence fluid pressure acting upon the plunger is quickly relieved through these clearance spaces and the radial holes 57 in the detent carrier, and is returned to the leg 29 of the exhaust passage through a bleed passage 85 in the end wall 11 of the valve body, via the bore 39 in the main member 38' of the body part 38. Because pressure fluid is relieved in this manner, the detent spring 58 will be operative to bias the cam member toward its detent defining position immediately after the detent mechanism has released the spool for return to neutral.

It will be appreciated that when the detent mechanism of this invention is associated with a valve spool that controls a single acting hydraulic cylinder, automatic release of the detent mechanism will be available only when the cylinder reaches the end of its working stroke, since the necessary rise in fluid pressure does not occur at the conclusion of the return stroke.

Figure 6:
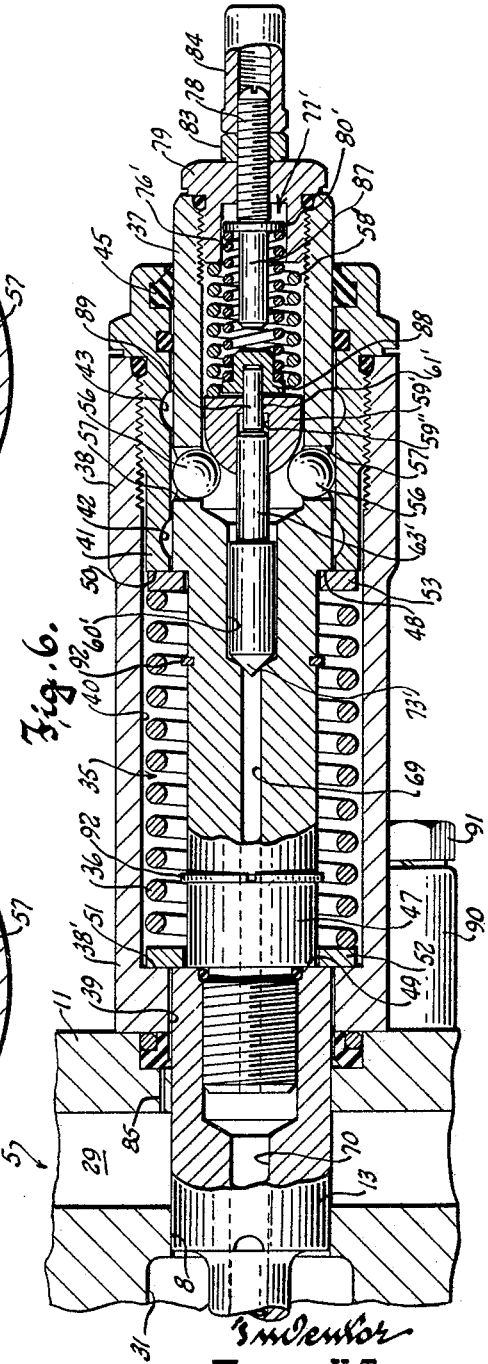
FIGURE 6 is a view similar to FIGURE 3 but illustrating a modified embodiment of the invention.

In the modified embodiment of the invention illustrated in FIGURE 6, both the detent spring 58' and the pilot valve spring 76' are located outwardly of the cam member 59', and the pilot valve 73' also serves as a plunger by which the cam member is moved out of its detent defining position when fluid pressure rises to its kick-out value. The spring seat member 77' comprises a set screw 78 which is coaxially engaged in a plug 79 fixed in the outer end of the detent carrier, and an abutment portion 80' in the detent carrier against which the inner end of the set screw bears and which provides an adjustable seat for the pilot valve spring 76'. Preferably the abutment portion includes an integral coaxial pilot portion 87 which projects inwardly and is encircled by the valve spring. The inner end of the valve spring bears against a hat shaped spring seat 88 on the pilot valve.

The pilot valve 73' has a substantially loose sliding fit in the bore 60' in the detent carrier, so that it can serve as a fluid pressure responsive plunger as well as a valve element. The cam member 59' has a coaxial bore 61' and an inwardly opening coaxial counterbore 59''. A reduced diameter medial portion 63' on the pilot valve element 73' is slidable in the counterbore 59'' in the cam member, while an even smaller diameter outward extension 89 of the valve element projects outwardly through the bore 61' in the cam member and has the hat shaped spring seat 88 secured over its outer end, so that the "crown" of the spring seat serves as a pilot for the valve spring while its "brim" portion receives the inward biasing force of the spring, which is thus transmitted to the pilot valve.

As the pilot valve element 73' is unseated by fluid at kick-out pressure, and is moved outwardly in response to the entry of such fluid into the bore 60' in the detent carrier, the outer end of its medial portion 63' will abut the bottom of the counterbore 59'' in the cam member. Further fluid pressure responsive movement of the pilot valve element in its unseating direction then carries the cam member outwardly away from its detent defining position, against the bias of the detent spring 58', far enough to enable the detent balls 54 to be cammed inwardly out of their holes in the manner described previously, thereby releasing the carrier and the spool to which it is attached for return travel to the neutral position of the spool.

From the foregoing description taken together with the accompanying drawings, it will be apparent that this invention provides an automatically releasable detent mechanism which is especially well adapted for cooperation with the spool of a hydraulic control valve, to define the operating positions of the spool, and which is provided with means for adjustably varying the value of kick-out pressure at which the mechanism effects release of the spool to allow its centering spring to return it to neutral position.

What is claimed as my invention is:

1. A detent device for releasably holding a tubular detent carrier in a defined position of axial motion along a bore in a body part in which the detent carrier is slidable, and wherein fluid entering the detent carrier at one end thereof at a predetermined pressure value effects release of the detent carrier for axial sliding motion in the bore, said detent device comprising: cam follower means carried by the detent carrier for axial movement therewith and for substantially radial movement relative thereto to and from a detent defining position in which the cam follower means projects partway out of the wall of the detent carrier through a hole therein to engage in a circumferential groove in the body part which opens to the bore; a cam member axially slidable in the detent carrier, said cam member having a coaxial bore therethrough and having a cam surface engageable with the cam follower means to maintain the latter in its detent defining position when the cam member is in one axial position relative to the detent carrier, spaced from said one end thereof, and by which the cam follower means is released for radially inward movement out of said detent defining position when the cam member is moved out of its said one axial position in the direction away from said one end of the detent carrier; a first yielding means in the detent carrier biasing the cam member axially toward its said one position; a fluid pressure responsive plunger slidable axially in the interior of the detent carrier, said plunger having a coaxial bore therethrough and having a motion transmitting connection with the cam member to move the same against its bias as a consequence of subjection of said plunger to fluid pressure; means in the detent carrier spaced from the other end thereof providing a valve seat through which pressure fluid must flow before the pressure of such fluid can be imposed upon the plunger; a valve element in the detent carrier movable axially toward and from engagement with the valve seat and adapted to be moved off of the seat by the pressure of fluid in said end of the carrier; a spring seat member having a stem portion extending axially through the bores in the cam member and the plunger, an inner end portion of the seat member providing an abutment which faces the valve element, and an outer end portion being accessible at the other end of the detent carrier; cooperating adjustment means on the detent carrier and on the outer end portion of the spring seat member to provide for axial adjustment of said abutment on the inner end portion of the spring seat member relative to the detent carrier; and a second yieldable biasing means reacting between the valve element and the abutment on the spring seat member, for biasing the valve element toward its seat with a force which depends upon the axial position of said abutment, so that the pressure at which fluid unseats the valve element and enters the interior of the detent carrier to produce plunger driven movement of the cam member out of its said one position is determined by the adjustment of the spring seat member.

2. Detent mechanism cooperable with an elongated hollow detent carrier and a body part having a bore in which the detent carrier is received, to releasably hold the body part and carrier against relative axial sliding movement until the pressure of fluid in one portion of the detent carrier reaches a predetermined value, said detent mechanism comprising: cam follower means confined in a hole in the wall of the detent carrier intermediate its ends for motion radially relative to it, to and from a position in which the cam follower means projects into a circumferential groove opening to the bore in the body part to thereby releasably hold the detent carrier and body part against relative axial motion; pressure responsive flow directing means in the detent carrier for admitting fluid from said one portion of the carrier to another portion thereof when the pressure of fluid in said one portion thereof reaches a predetermined value, comprising a pressure responsive valve mechanism having cooperating valve elements one of which is engageable with the other to block flow of fluid from said one portion of the detent carrier to the other and is axially movable away from such engagement in response to pressure of fluid in said one portion of the detent carrier, a pair of spring seat elements providing axially oppositely facing abutments and one of which is connected with said one valve element, a first yieldable biasing means comprising a compression spring reacting between said abutments on the spring seat elements to bias said one valve element toward engagement with the other, and means accessible at the exterior of the detent carrier and cooperating with the same to provide for adjustment of said spring seat elements relatively toward and from one another to effect variation of the force exerted by the compression spring; a cam member in the interior of the detent carrier having a coaxial bore through which a portion of said pressure responsive flow directing means extends and having a cam surface engaged with the cam follower means, said cam member being axially slidable in the detent carrier toward and from a position in which it holds the cam follower means projected into said circumferential groove in the body part; means in the detent carrier providing a second yieldable biasing means which biases the cam member toward its said position; and means in said other portion of the detent carrier providing an axially slidable fluid pressure responsive plunger having a motion transmitting connection with the cam member by which pressure fluid admitted to said other portion of the detent carrier when said one valve elevent is moved out of engagement with the other effects motion of the cam member away from its said position, against the force of said second biasing means.

3. Detent mechanism of the type having an elongated detent carrier and wherein a cam member cooperable with a detent in the detent carrier is axially movable in opposite directions in a hollow portion of the carrier adjacent to one end thereof, and a yieldable biasing means urges the cam member in one direction toward an operative position of engagement with the detent to maintain the same effective, characterized by: the fact that the cam member has an axial hole therethrough; and means for effecting movement of the cam member in the direction to disengage it from the detent and counter to the biasing force thereon, said means including a fluid pressure responsive plunger slidable axially in a bore in the carrier and having a motion transmitting connection with the cam member whereby sliding movement of the plunger in one direction in said bore effects motion of the cam member in the detent disengaging direction; passage means in the carrier for conducting fluid under pressure from the other end of the carrier into said bore to cause the plunger to be shifted in its said one direction, valve mechanism in the carrier governing admission of fluid into the bore and including cooperating valve members, one of which is movable toward and from a valve closed position of engagement with the other and is moved out of said position in response to the pressure of fluid admitted into said other end of the carrier, spring means separate from said yieldable biasing means, for yieldingly biasing said one valve member toward its valve closed position, an axially adjustable element accessible at the exterior of the detent carrier projecting coaxially thereinto from said one end thereof, and adapted to vary the biasing force which said compression spring can exert upon said movable valve element, and means cooperating with said adjustable element for loading said spring means and for applying the force thereof to said movable valve member to yieldingly resist movement of the same out of its valve closed position, said last named means including a part which extends through the hole in the cam member.

4. Detent mechanism comprising the combination of: inner and outer telescopically connected tubular members the inner of which has a hole through its wall and the outer of which has a circumferential groove in its bore, one of said members being at all times movable axially relative to the other to and from a position at which said groove and hole are in register; a cam in the inner member movable axially relative thereto, to and from an operative position adjacent to said hole; a detent pressure spring in the inner member acting upon the cam to yieldingly urge the same toward said operative position thereof; a cam follower engaged by the cam under the force of said spring and loosely received in said hole in the wall of the inner member, said follower being projectable part way outwardly of said hole by the cam to an operative detent defining position of engagement in said groove in the outer member whenever the groove and hole are in register to yieldingly resist axial movement of said one tubular member relative to the other, said follower being cammingly projectable inwardly of its hole by the outer tubular member in consequence of movement of said one member relative to the other out of a position at which the groove and hole are in register, such inward motion of the follower effecting axial movement of the cam against the force of the detent pressure spring acting thereon; a pressure responsive plunger in the inner member having a motion transmitting connection with the cam and operable to move the same axially counter to the bias thereon to an inoperative detent releasing position when the plunger is subjected to pressure; normally closed valve means in the mechanism including an annular valve seat through which pressure fluid flows, when the valve means is open, to effect plunger produced motion of the cam to a detent releasing position, a pressure responsive valve element cooperable with the seat to close the same in one position of the valve element, and a second spring in the mechanism acting upon the valve element to normally hold the same upon its seat, said second spring being yieldable to permit movement of the valve element off of its seat in response to subjection of the valve element to pressure in excess of a predetermined value and being independent of said detent pressure spring, whereby the force which fluid pressure must exert upon the valve element to unseat the same is independent of the force with which the follower is yieldingly held in its detent defining position; and means on the mechanism connected with said second spring for adjusting the force which the latter exerts upon the valve element to hold it seated, so as to provide for adjustment of the response of the valve element to different pressure values without disturbing the force with which the cam follower is held in its detent defining position.

5. In an automatically releasable detent mechanism: an assembly comprising a pair of telescopically connected tubular members, the inner one of which provides a detent carrier having a hole in its wall, and the outer one of which has a circumferential groove in its bore opening to the exterior of the carrier; a cam member axially movably received in the carrier; a detent pressure spring confined in the mechanism at one end portion of the assembly and acting upon the cam member to urge the same toward the other end of the assembly; a cam follower on the carrier loosely fitting said hole therein and confined between the cam member and the wall of the outer tubular member under the force of the spring bias acting upon the cam member, said cam member being adapted to propel the follower part way out of its hole and into engagement with the groove in the outer tubular member whenever the groove is in register with said hole to thus hold the tubular members against relative axial motion except upon the application of force to one of the tubular members in excess of the yielding bias imposed upon the follower by the detent pressure spring, portions of the outer tubular member at the groove therein acting as a cam to propel the follower inwardly of its hole during such relative axial movement of the tubular members, and the cam member being constructed to provide for axial camming thereof toward said one end of the assembly by the follower in consequence of such inward motion of the follower into its hole; a pressure responsive plunger carried by the assembly for sliding motion coaxially of the cam member and located at the side of the latter remote from said one end portion of the assembly; means providing a motion transmitting connection between the cam member and an adjacent portion of the plunger operable to effect cam follower releasing motion of the cam member against the biasing force acting thereon in consequence of subjection of the plunger to pressure, so as to thus free the tubular members of the detent action of the follower; means in the carrier providing an annular valve seat located between the plunger and said other end portion of the assembly, which seat is coaxial with and faces the plunger, and through which pressure fluid can act upon the plunger; means in the assembly providing a valve element which is movable axially toward and from engagement with the valve seat and is adapted to be moved off of its seat by the pressure of fluid applied to the valve element through its seat; adjustable force applying means for effecting imposition of any of a number of different biasing forces on the valve element that yieldingly resist fluid pressure produced motion thereof off of its seat, comprising an adjusting member on said one end portion of the assembly accessible from the exterior of the mechanism and mounted on the assembly for axial adjusting motion toward and from the valve seat, a spring independent of said detent spring and reacting between said adjusting member and the valve element with a force depending upon the position of axial adjustment of the adjusting member; and the cam member having a coaxial bore through which a portion of said force applying means extends.

6. The detent mechanism of claim 5, wherein said pressure responsive plunger is constructed to provide said valve element.

7. The detent mechanism of claim 6, wherein said valve biasing spring is disposed in said one end portion of the assembly and exerts valve closing biasing force upon the plunger by engagement with said portion of the force applying means that extends through the bore in the cam member.

References Cited in the file of this patent

UNITED STATES PATENTS

| 2,605,108 | Stephens | July 29, 1952 |
| 2,615,177 | Schlichting | Oct. 28, 1952 |
| 2,632,821 | Wright et al. | Mar. 24, 1953 |
| 2,752,930 | Stouder | July 3, 1956 |
| 2,874,720 | Vahs | Feb. 24, 1959 |
| 3,040,772 | Todd | June 26, 1962 |